US009063543B2

(12) United States Patent
An et al.

(10) Patent No.: US 9,063,543 B2
(45) Date of Patent: Jun. 23, 2015

(54) APPARATUS AND METHOD FOR COOPERATIVE AUTONOMOUS DRIVING BETWEEN VEHICLE AND DRIVER

(71) Applicant: Electronics and Telecommunications Research Institute, Daejeon (KR)

(72) Inventors: Kyoung-Hwan An, Daejeon (KR); Woo-Yong Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/023,873

(22) Filed: Sep. 11, 2013

(65) Prior Publication Data
US 2014/0244096 A1 Aug. 28, 2014

(30) Foreign Application Priority Data
Feb. 27, 2013 (KR) .................. 10-2013-0021258

(51) Int. Cl.
*G01C 22/00* (2006.01)
*G05D 1/00* (2006.01)
(52) U.S. Cl.
CPC .................. *G05D 1/0055* (2013.01)
(58) Field of Classification Search
CPC ...... G05D 1/005; G05D 1/0274; G05D 1/024; G05D 1/0278; G05D 1/0027
USPC ............ 701/24, 45, 93, 97, 98; 340/575, 576
See application file for complete search history.

(56) References Cited

U.S. PATENT DOCUMENTS

| 2005/0030184 | A1* | 2/2005 | Victor | 340/576 |
| 2007/0052530 | A1* | 3/2007 | Diebold et al. | 340/467 |
| 2007/0225882 | A1* | 9/2007 | Yamaguchi et al. | 701/36 |
| 2009/0326796 | A1* | 12/2009 | Prokhorov | 701/200 |
| 2011/0241862 | A1* | 10/2011 | Debouk et al. | 340/439 |
| 2012/0083960 | A1* | 4/2012 | Zhu et al. | 701/23 |
| 2012/0323479 | A1* | 12/2012 | Nagata | 701/301 |
| 2013/0131907 | A1* | 5/2013 | Green et al. | 701/23 |

FOREIGN PATENT DOCUMENTS

| KR | 1997-0011789 | 3/1997 |
| KR | 10-2006-0110299 | 10/2006 |
| KR | 10-2010-0088943 | 8/2010 |

* cited by examiner

*Primary Examiner* — Helal A Algahaim
*Assistant Examiner* — Shardul Patel
(74) *Attorney, Agent, or Firm* — Kile Park Reed & Houtteman PLLC

(57) ABSTRACT

The present invention relates to an apparatus and method for performing cooperative autonomous driving between a vehicle and a driver. For this, a cooperative autonomous driving apparatus according to the present invention includes a driver state determination unit for determining a state of a driver and calculating the state of the driver as a risk index. An autonomous driving control unit classifies section characteristics of respective sections included in a path to a destination corresponding to the driver based on section data stored in a database (DB), and controls autonomous driving of a vehicle in which the driver is riding, based on a driving environment recognized for the path to the destination corresponding to the driver. A driving control determination unit determines driving modes of the respective sections included in the path based on the state of the driver and the section characteristics.

21 Claims, 6 Drawing Sheets

APPARATUS AND METHOD FOR COOPERATIVE AUTONOMOUS DRIVING BETWEEN VEHICLE AND DRIVER

CROSS REFERENCE TO RELATED APPLICATION

This application claims the benefit of Korean Patent Application No. 10-2013-0021258 filed on Feb. 27, 2013, which is hereby incorporated by reference in its entirety into this application.

BACKGROUND OF THE INVENTION

1. Technical Field

The present invention relates generally to an apparatus and method for performing cooperative autonomous driving (co-piloting) between a vehicle and a driver and, more particularly, to a cooperative autonomous driving apparatus and method, which determine driving performance depending on the states of the vehicle and the driver and dynamically decides on an agent of driving when the driver is driving the vehicle on a road.

2. Description of the Related Art

Currently, driver assistance systems for assisting a driver who is driving a vehicle are available. For example, driver assistance systems include an Adaptive Cruise Control (ACC) system, a Lane Departure Warning System (LDWS), a Lane Keeping System (LKS), etc. Such a driver assistance system is advantageous in that it partially assists a driver with longitudinal or lateral control of the vehicle, thus making driving more convenient. In contrast, such a driver assistance system has a limitation in that it must prepare for the driver's intervention. Therefore, there is a disadvantage in that when the driver dozes off while driving, or cannot drive due to his or her health condition, a conventional driver assistance system cannot assist the driver.

Further, research into an autonomous driving vehicle capable of driving from an origin to a destination without intervention of the driver has recently been conducted. However, there is a problem in that error in the recognition and determination of sensors may occur depending on a driving environment including road or weather conditions, thus making it impossible to consistently guarantee the safety of the driver.

In relation to this, Korean Patent Application Publication No. 10-2006-0110299 entitled "Method and apparatus for reducing damage caused by accidents" is disclosed.

SUMMARY OF THE INVENTION

Accordingly, the present invention has been made keeping in mind the above problems occurring in the prior art, and an object of the present invention is to provide a cooperative autonomous driving apparatus and method, which can allocate driving control to an object having high driving performance by taking into consideration a driving situation, the state of a driver, and the performance of an autonomous driving apparatus.

Another object of the present invention is to provide a cooperative autonomous driving apparatus and method, which enable a vehicle to be cooperatively driven between the vehicle and a driver.

In accordance with an aspect of the present invention to accomplish the above objects, there is provided a cooperative autonomous driving apparatus including a driver state determination unit for determining a state of a driver and calculating the state of the driver as a risk index; an autonomous driving control unit for classifying section characteristics of respective sections included in a path to a destination corresponding to the driver based on section data stored in a database (DB), and controlling autonomous driving of a vehicle in which the driver is riding, based on a driving environment recognized for the path to the destination corresponding to the driver; and a driving control determination unit for determining driving modes of the respective sections included in the path based on the state of the driver and the section characteristics.

Preferably, each of the driving modes of the sections may include one of a manual mode, a cooperative driving mode, an emergency driving mode for a failure in autonomous driving, and an emergency driving mode for non-reaction of the driver, and the cooperative driving mode may include a driver-leading cooperative driving mode and an autonomous driving-leading cooperative driving mode.

Preferably, the driving control determination unit may be capable of changing a current driving mode to another driving mode corresponding to the state of the driver and the section characteristics in a section in which the vehicle is traveling.

Preferably, the cooperative autonomous driving apparatus may further include an autonomous driving data processing unit for, after the vehicle has moved to a subsequent section, reclassifying the section characteristics using risk indices of the respective sections calculated based on the driving environment, and updating the section data stored in the DB based on the reclassified section characteristics.

Preferably, the autonomous driving data processing unit may be configured to, after the vehicle has moved to the subsequent section, set a previous section to a cooperative driving possible section if a risk index of the previous section is greater than a preset driving possible risk index and is less than a preset driving impossible risk index.

Preferably, the autonomous driving data processing unit may be configured to, after the vehicle has moved to the subsequent section, set a previous section to an autonomous driving impossible section if a risk index of the previous section is greater than a preset driving impossible risk index.

Preferably, the autonomous driving data processing unit may be configured to, after the vehicle has moved to the subsequent section, set a previous section to an autonomous driving possible section if a risk index of the previous section is less than a preset driving possible risk index.

Preferably, the autonomous driving data processing unit may be configured to, when the vehicle is traveling in a current section, calculate a risk index of the current section, and update a previously stored risk index of the current section to the calculated risk index if the calculated risk index is greater than the previously stored risk index of the current section.

Preferably, the driver state determination unit may determine a dozing state or an inattentive state of the driver using an eyetracker for tracking eye blinking or line of sight of the driver.

Preferably, the driver state determination unit may determine an inattentive state of the driver by checking whether a nomadic device or a device in the vehicle has been used.

Preferably, the driver state determination unit may include a risk index determination module for converting the state of the driver into a numerical risk index.

In accordance with another aspect of the present invention to accomplish the above objects, there is provided a cooperative autonomous driving method including determining, by a driver state determination unit, a state of a driver and calculating the state of the driver as a risk index; classifying, by an autonomous driving control unit, section characteristics of respective sections included in a path to a destination corresponding to the driver based on section data stored in a database (DB); determining, by a driving control determination unit, driving modes of the respective sections included in the path based on the state of the driver and the section characteristics; and controlling, by the autonomous driving control unit, autonomous driving of a vehicle in which the driver is riding, based on a driving environment recognized for the path to the destination corresponding to the driver.

Preferably, each of the driving modes of the sections may include one of a manual mode, a cooperative driving mode, an emergency driving mode for a failure in autonomous driving, and an emergency driving mode for non-reaction of the driver, and the cooperative driving mode includes a driver-leading cooperative driving mode and an autonomous driving-leading cooperative driving mode.

Preferably, determining the driving modes of the sections may be configured to be capable of changing a current driving mode to another driving mode corresponding to the state of the driver and the section characteristics in a section in which the vehicle is traveling.

Preferably, the cooperative autonomous driving method may further include after controlling the autonomous driving of the vehicle in which the driver is riding, after the vehicle has moved to a subsequent section, reclassifying, by the autonomous driving data processing unit, the section characteristics using risk indices of the respective sections calculated based on the driving environment, and updating the section data stored in the DB based on the reclassified section characteristics.

Preferably, updating the section data may be configured to, after the vehicle has moved to the subsequent section, set a previous section to a cooperative driving possible section if a risk index of the previous section is greater than a preset driving possible risk index and is less than a preset driving impossible risk index.

Preferably, updating the section data may be configured to, after the vehicle has moved to the subsequent section, set a previous section to an autonomous driving impossible section if a risk index of the previous section is greater than a preset driving impossible risk index.

Preferably, updating the section data may be configured to, after the vehicle has moved to the subsequent section, set a previous section to an autonomous driving possible section if a risk index of the previous section is less than a preset driving possible risk index.

Preferably, updating the section data may be configured to, when the vehicle is traveling in a current section, calculate a risk index of the current section, and update a previously stored risk index of the current section to the calculated risk index if the calculated risk index is greater than the previously stored risk index of the current section.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
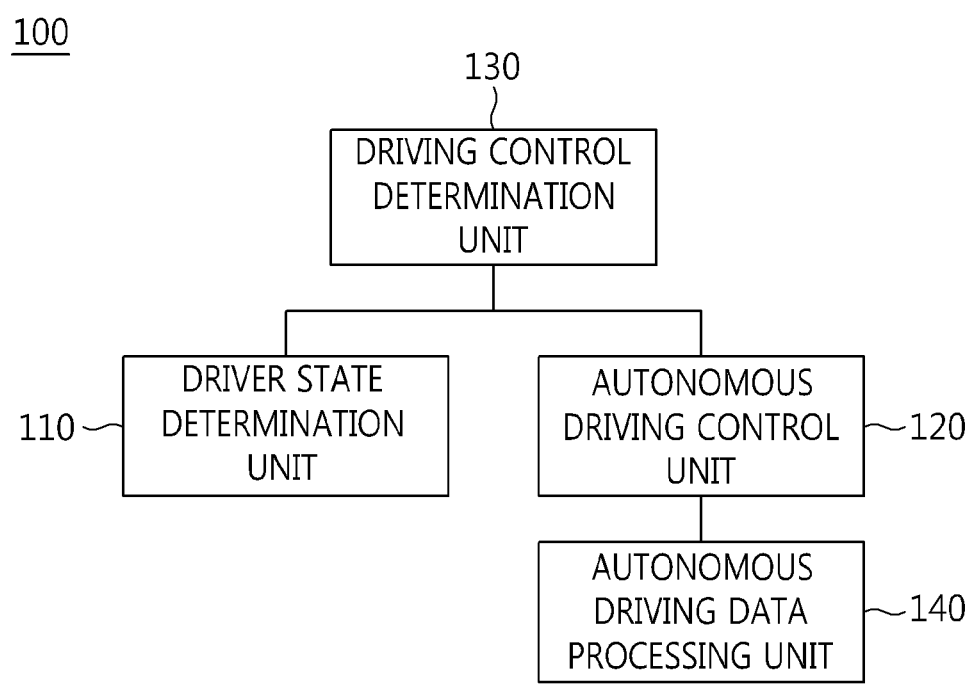
FIG. 1 is a block diagram showing a cooperative autonomous driving apparatus according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

FIG. 1 is a block diagram showing a cooperative autonomous driving apparatus 100 according to an embodiment of the present invention. Below, the cooperative autonomous driving apparatus 100 according to the embodiment of the present invention will be described in detail with reference to FIG. 1. The cooperative autonomous driving apparatus 100 according to the embodiment of the present invention includes a driver state determination unit 110, an autonomous driving control unit 120, a driving control determination unit 130, and an autonomous driving data processing unit 140. The components of the cooperative autonomous driving apparatus 100 are described below.

The driver state determination unit 110 functions to determine an abnormal state of a driver, such as dozing off, inattention, or non-response of the driver. The driver state determination unit 110 tracks the blinking of the driver's eyes or the line of sight using, for example, an eyetracker, and then determines whether the driver dozes off or is inattentive. Further, the driver state determination unit 110 may check whether a nomadic terminal or each device in the vehicle is used and then determine whether the driver is inattentive. Furthermore, the driver state determination unit 110 may determine the state of the driver based on driving information, such as the speed, steering angle, and variable speed of the vehicle calculated by the autonomous driving control unit 120. Furthermore, the driver state determination unit 110 may convert the state of the driver into a risk index. The risk index of the driver may be determined using the following Equation (1):

$$\text{driver risk index} = (\text{driver state risk index}) * (\text{driving environment risk index}) \quad (1)$$

As shown in Equation (1), the driver risk index is calculated by multiplying a driver state risk index by a driving environment risk index. Here, the driver state risk index is calculated using the following Equation (2):

$$\text{driver state risk index} = f(\text{driver state}) \qquad (2)$$

In Equation (2), function f( ) denotes a mapping function. Therefore, the driver state risk index is calculated by mapping the driver state to a lookup table configured using experiments between risk indices. Here, the lookup table is a table in which the degrees of error in recognition or determination are converted into risk indices depending on the degrees of the driver state, for example, dozing off while driving, inattention, and non-reaction, and the risk indices are stored. Further, the driving environment risk index shown in Equation (1) is calculated by the following Equation (3):

$$\text{driving environment risk index} = 1/(W1^*\text{Min(TTC)} + W2^*\text{Min(TIV)}) \qquad (3)$$

As shown in Equation (3), the driving environment risk index is an index for measuring the dynamic environment of a road, that is, a driving environment. That is, the driving environment risk index is an index obtained by converting a risk of collision between a vehicle in which the driver is riding and neighboring vehicles into a numerical value. For this, weights W1 and W2 are respectively multiplied by a minimum value of Time To Collision (TTC) values with neighboring vehicles and a minimum value of InterVehicular Time (TIV) values with the neighboring vehicles, the sum of these multiplication results is obtained, and then a resulting value is obtained in the form of an inverse function. Here, equations required to obtain TTC and TIV are given in the following Equations (4) and (5):

$$TTC = \frac{\text{(relative distance between host vehicle and target vehicle)}}{\text{(relative speed between host vehicle and target vehicle)}} \qquad (4)$$

$$TIV = \frac{\text{(relative distance between host vehicle and target vehicle)}}{\text{(host vehicle speed)}} \qquad (5)$$

The autonomous driving control unit 120 functions to classify the section characteristics of a path based on section data stored in a separate database (DB), and control the autonomous driving of the vehicle based on a driving environment recognized for a path to the destination corresponding to the driver. Here, the section characteristics are classified into an autonomous driving possible section, an autonomous driving impossible section, a cooperative driving possible section, and an undecided section. In this case, the autonomous driving possible section denotes a section in which an autonomous driving risk index is less than a preset driving possible risk index. The cooperative driving possible section denotes a section in which the autonomous driving risk index is greater than the preset driving possible risk index and is less than a preset driving impossible risk index. The autonomous driving impossible section denotes a section in which the autonomous driving risk index is greater than the preset driving impossible risk index. Finally, the undecided section denotes a section in which a vehicle has not yet been driven. In the above description, the autonomous driving risk index may be calculated by the following Equation (6):

$$\text{autonomous driving risk index} = (\text{autonomous driving state risk index})^*(\text{driving environment risk index}) \qquad (6)$$

As shown in Equation (6), the autonomous driving risk index is calculated by multiplying an autonomous driving state risk index by a driving environment risk index. Here, the autonomous driving state risk index is an index indicating whether basic autonomous driving is possible in the driving environment. Such an autonomous driving state risk index may be calculated by the following Equation (7):

$$\text{autonomous driving state risk index} = W1^*\text{recognition error} + W2^*\text{determination error} + W3^*\text{control error} + W4^*\text{map data error} \qquad (7)$$

Referring to Equation 7, the autonomous driving state risk index is calculated by multiplying weights W1, W2, W3, and W4 by a recognition error, a determination error, a control error, and a map data error, respectively, and by obtaining the sum of multiplication results. In this case, the weights W1, W2, W3, and W4 are values determined according to the importance level used in an autonomous driving algorithm. Here, the recognition error includes a GPS reception error, a lane recognition error, an obstacle recognition error, a traffic light recognition error, etc. Further, the determination error includes errors in driving behavior, such as maintaining a lane, changing a lane and going through an intersection. Further, the control error denotes a difference between a planned path and an actually tracked path. Finally, the map data error denotes a difference between map data stored in a database (DB), as in the case of a navigation terminal, and actually recognized map data.

The autonomous driving control unit 120 may use a location acquisition device, such as a Global Positioning System (GPS) or an Inertial Navigation System (INS), in order to acquire the location of the vehicle in which the driver is riding. Further, the autonomous driving control unit 120 may recognize a driving environment using a camera, lidar, radar, or the like so as to recognize a road and an obstacle. Furthermore, the autonomous driving control unit 120 may utilize an intra-vehicle sensor or the like so as to detect the states of the vehicle, for example, the speed, acceleration, steering angle, yaw angle, etc. of the vehicle.

In addition, the autonomous driving control unit 120 executes a path planning and behavior control algorithm required to conduct autonomous driving. Here, the autonomous driving control unit 120 may calculate an autonomous driving possible section based on the section information updated by the autonomous driving data processing unit 140. Further, the autonomous driving control unit 120 may exchange information, such as driving mode change notification, risk information notification, and driver command recognition, with the driver, through a Human Vehicle Interface (HVI). Furthermore, the autonomous driving control unit 120 may automatically control the vehicle using a vehicle actuator, or exchange various types of information, such as the location, speed, lane change intention, and event information of a neighboring vehicle, with the neighboring vehicle.

The driving control determination unit 130 determines the driving modes of respective sections included in the path to a destination, based on the driver state determined by the driver state determination unit 110 and the section characteristics classified by the autonomous driving control unit 120. Here, the driving modes are configured to include a manual mode, a cooperative driving (co-piloting) mode, an autonomous driving mode, an emergency driving mode for a failure in autonomous driving, and an emergency driving mode for the non-reaction of a driver. Further, the cooperative driving mode includes a driver-leading cooperative driving mode in which the driver leads driving and the cooperative autonomous driving apparatus assists driving, and an autonomous driving-leading cooperative driving mode in which the cooperative autonomous driving apparatus leads driving and the driver assists driving. Individual driving modes are described in detail below.

First, the manual mode is a mode in which the driver performs all of recognition, determination, and control. The driver-leading cooperative driving mode is a mode in which the driver makes a final decision on all of recognition, determination, and control and drives a vehicle, and in which the cooperative autonomous driving apparatus 100 provides recognition information, determination information, control information, etc. to the driver. That is, the driver-leading cooperative driving mode is a mode in which the driver leads driving and the cooperative autonomous driving apparatus assists the driver in driving. The autonomous driving-leading cooperative driving mode is a mode in which the cooperative autonomous driving apparatus performs all of recognition, determination, and control, and if necessary, driving is performed under the confirmation of the driver. Here, the driver must continuously monitor the driving of the cooperative autonomous driving apparatus, and may intervene the control of driving if necessary. The autonomous driving mode is a mode in which the driver does not intervene the driving of the cooperative autonomous driving apparatus and the cooperative autonomous driving apparatus performs all of recognition, determination, and control. The emergency driving mode for a failure in autonomous driving is a mode prepared against a failure in autonomous driving. That is, the emergency driving mode for a failure in autonomous driving is configured to suddenly stop the vehicle, turn on/off an emergency lamp, or contact a call center. The emergency driving mode for the non-reaction of a driver is a mode performed in a case where, due to the impossibility of autonomous driving, it is intended to hand the control of driving over to the driver, but the driver does not make a response. In the emergency driving mode for the non-reaction of the driver, activity such as stopping the vehicle at the shoulder of a road, turning on/off the emergency lamp, or contacting a call center may be taken.

The autonomous driving data processing unit 140 reclassifies section characteristics based on the risk indices of previous sections after the vehicle in which the driver rides has passed through a plurality of sections on the path. In greater detail, the autonomous driving data processing unit 140 reclassifies section characteristics using the risk indices of the previous sections calculated based on the driving environment after the vehicle has moved to a subsequent section. Thereafter, pieces of section data stored in the DB are updated based on the reclassified section characteristics. By means of this, the vehicle uses updated information when passing through the plurality of sections later, thus enabling safer driving to be conducted. A procedure performed by the autonomous driving data processing unit 140 is described below.

First, the initialization of devices required for update is performed. Thereafter, the autonomous driving control unit 120 acquires the current location of a recognized vehicle. Here, when the acquisition of the current location fails or when the current location falls out of a predicted error range, the current location is predicted based on existing data. Thereafter, a current section is predicted by performing map matching based on the predicted location. Then, the risk index of the current section stored in section data is set to a maximum value. The reason for this is that it is difficult to currently acquire the location from the corresponding section, thus causing various problems in autonomous driving. In contrast, when the acquisition of the current location succeeds and the current location falls within the predicted error range, current section information is acquired. Based on the current section information, it is determined whether the vehicle in which the driver is riding has entered a new section. In this case, if it is determined that the vehicle has not entered a new section, an autonomous driving risk index is calculated, and the calculated risk index is compared with a value previously stored in the section data. As a result of the comparison, if the calculated risk index is greater than the value stored in the section data, the value stored in the section data is updated to the calculated risk index. Further, if it is determined that the vehicle has entered the new section, a previous section is reclassified based on the risk index of the previous section. Such reclassification is performed by comparing the risk index of the previous section, a preset driving possible risk index, and a preset driving impossible risk index. That is, if the risk index of the previous section is less than the driving possible risk index, the previous section is set to an autonomous driving possible section. Further, if the risk index of the previous section is greater than the preset driving possible risk index and is less than the preset driving impossible risk index, the previous section is set to a cooperative driving possible section. Furthermore, if the risk index of the previous section is greater than the preset driving impossible risk index, the previous section is set to an autonomous driving impossible section.

Figure 2:
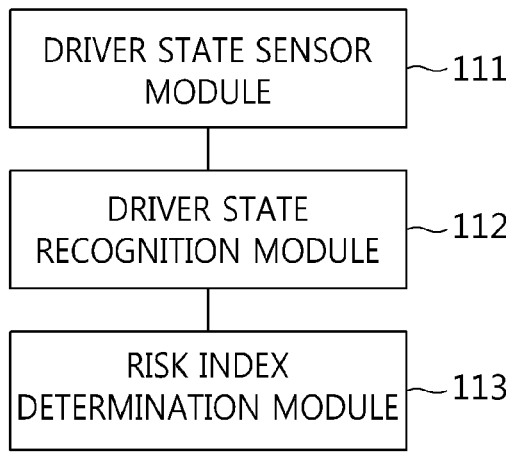
FIG. 2 is a block diagram showing a driver state determination unit included in the cooperative autonomous driving apparatus according to an embodiment of the present invention.

FIG. 2 is a block diagram showing the driver state determination unit 110 of FIG. 1. The driver state determination unit 110 included in the cooperative autonomous driving apparatus 100 is described below with reference to FIG. 2. The driver state determination unit 110 includes a driver state sensor module 111, a driver state recognition module 112, and a risk index determination module 113.

The driver state sensor module 111 determines the dozing or inattentive state of the driver by tracking the blinking of eyes of the driver or the line of sight of the driver. Such a driver state sensor module 111 may perform determination using an eyetracker.

The driver state recognition module 112 may determine the inattentive state of the driver by checking whether a nomadic terminal or each device present in the vehicle has been used. Further, the driver state recognition module 112 may receive recognition information related to driving, such as the speed, steering angle, and variable speed of the vehicle recognized by the autonomous driving control unit, and further determine the inattentive state of the driver.

The risk index determination module 113 functions to convert the state of the driver into a risk index. Since the conversion procedure has been described above with reference to FIG. 1, a description thereof will be omitted here for the simplicity of the description of the specification.

Figure 3:
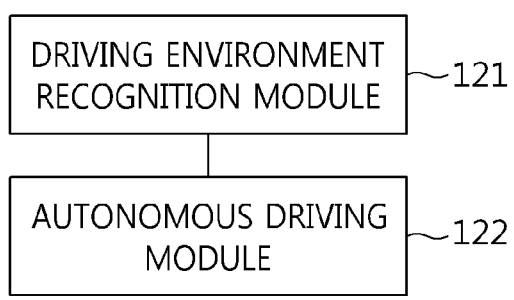
FIG. 3 is a block diagram showing the autonomous driving control unit of the cooperative autonomous driving apparatus according to an embodiment of the present invention.

FIG. 3 is a block diagram showing the autonomous driving control unit 120 of FIG. 1. Below, the autonomous driving control unit 120 of the cooperative autonomous driving apparatus 100 according to an embodiment of the present invention will be described with reference to FIG. 3.

A driving environment recognition module 121 functions to recognize the location of a vehicle in which a driver is riding, the state of the vehicle, and the driving environment of the vehicle. For this, the driving environment recognition module 121 may use a location acquisition device such as a GPS or an INS, a camera, lidar, radar, an inter-vehicle sensor, or the like.

An autonomous driving module 122 may calculate an autonomous driving possible section based on section information updated by the autonomous driving data processing unit 140. Further, the autonomous driving module 122 may exchange information, such as driving mode change notification, risk information notification, and driver command recognition, with the driver, through a HVI. Furthermore, the autonomous driving module 122 may automatically control the vehicle using a vehicle actuator, or exchange various types of information, such as the location, speed, lane change intention, and event information of a neighboring vehicle, with the neighboring vehicle.

Figure 4:
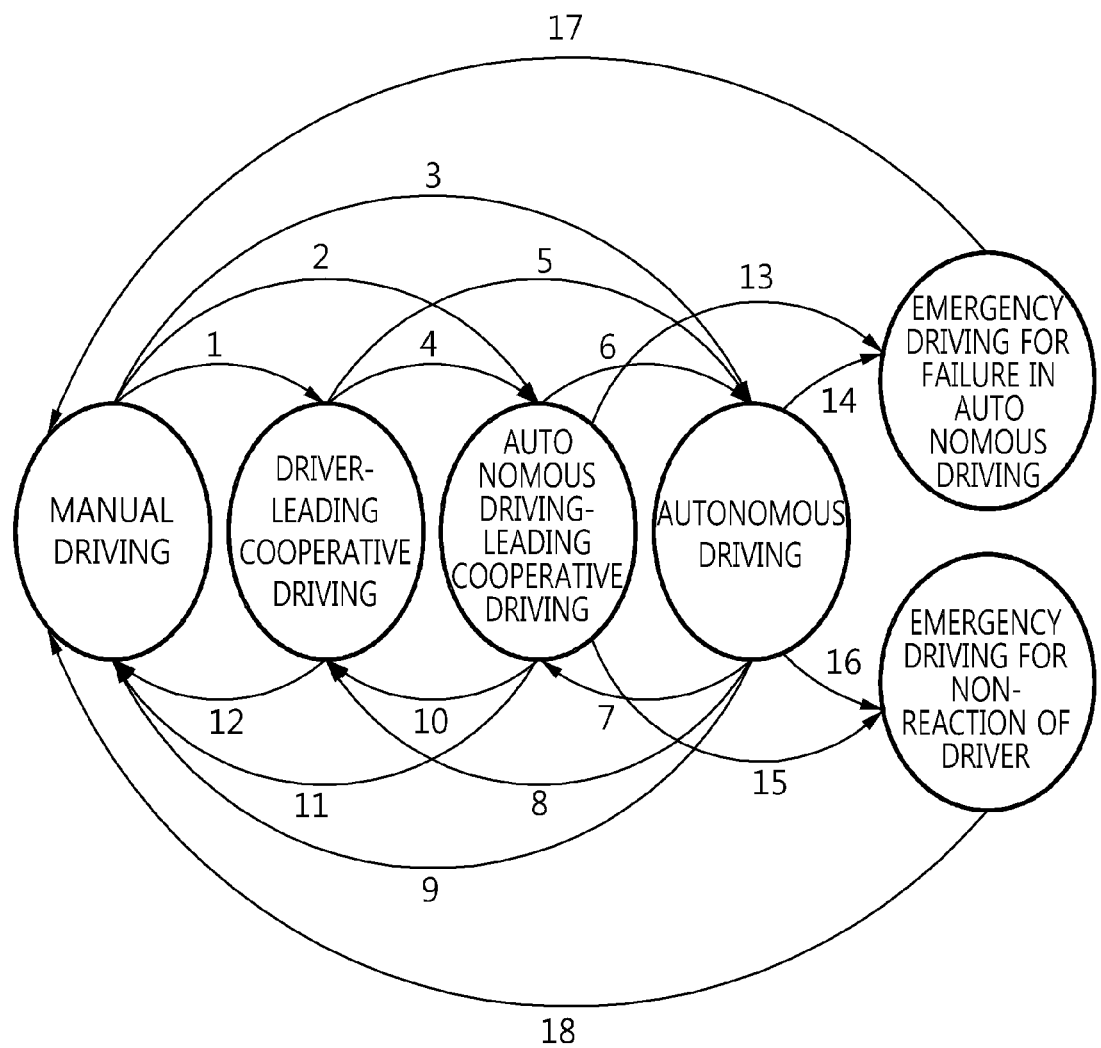
FIG. 4 is a diagram illustrating examples of the change of a driving mode which can be performed by the driving control determination unit of the cooperative autonomous driving apparatus according to an embodiment of the present invention.

FIG. 4 is a diagram illustrating examples of the change of a driving mode which can be performed by the driving control determination unit of the cooperative autonomous driving apparatus according to an embodiment of the present invention. Below, the examples of the change of a driving mode which can be performed by the driving control determination unit 130 of the cooperative autonomous driving apparatus 100 according to the embodiment of the present invention will be described with reference to FIG. 4.

The change of a driving mode which can be performed by the driving control determination unit 130 is chiefly divided into two types. That is, the change of the driving mode is divided into convenience-centered driving control change and safety-centered driving control change.

The convenience-centered driving control change is characterized in that the driver is in a normal state and always explicitly requests the change of a driving mode. Such convenience-centered driving control change may be performed depending on change methods and conditions shown in the following Table 1. In the attributes of Table 1, 'change number' denotes each numeral shown in FIG. 4. Further, in attributes of the following Table 1, 'change method' denotes a method for enabling a driving mode to be changed. Furthermore, in the attributes of the following Table 1, 'change condition' denotes a preceding condition required to enable changes.

TABLE 1

| Change No. | Driving control change method and condition |
|---|---|
| 1 | A driver requests change through an HVI (via button pressing or speech recognition) when the driver is in normal state, and when a cooperative autonomous driving apparatus is normally operated |
| 2 | A driver requests change through an HVI (via button pressing or speech recognition) when the driver is in normal state, and when a vehicle is present in a cooperative driving possible section |
| 3 | A driver requests change through an HVI (via button pressing or speech recognition) when the driver is in normal state, and when a vehicle is present in an autonomous driving possible section |
| 4 | A driver requests change through an HVI (via button pressing or speech recognition) when the driver is in normal state, and when a vehicle is present in a cooperative driving possible section |
| 5 | A driver requests change through an HVI (via button pressing or speech recognition) when the driver is in normal state, and when a vehicle is present in an autonomous driving possible section |
| 6 | A driver requests change through an HVI (via button pressing or speech recognition) when the driver is in normal state, and when a vehicle is present in an autonomous driving possible section |
| 7 | A cooperative autonomous driving apparatus requests change through an HVI (via display or speech) when the driver is in normal state, and when a predetermined time before a change from an autonomous driving possible section to an autonomous driving-leading cooperative driving possible section is made The driver requests change through the HVI (via button pressing or speech recognition) when the driver is in normal state, and when a vehicle is present in the autonomous driving possible section |
| 8 | A cooperative autonomous driving apparatus requests change through an HVI (via display or speech) or A driver changes mode through the HVI (via button pressing or speech recognition) when the driver is in normal state, and the cooperative autonomous driving apparatus must be normally operated |
| 9 | A cooperative autonomous driving apparatus requests change through an HVI (via display or speech) or A driver changes mode through the HVI (via button pressing or speech recognition) when the driver is in normal state |
| 10 | A cooperative autonomous driving apparatus requests change through an HVI (via display or speech) or A driver changes mode through the HVI (via button pressing or speech recognition) when the driver is in normal state, and the cooperative autonomous driving apparatus must be normally operated |
| 11 | A cooperative autonomous driving apparatus requests change through an HVI (via display or speech) or A driver changes mode through the HVI (via button pressing or speech recognition) when the driver is in normal state |

TABLE 1-continued

| Change No. | Driving control change method and condition |
|---|---|
| 12 | A driver changes mode through an HVI (via button pressing or speech recognition) when the driver is in normal state |
| 13, 14 | Mode is automatically changed by a cooperative autonomous driving apparatus when part of hardware or software of the cooperative autonomous driving apparatus fails |
| 15, 16 | Mode is automatically changed by a cooperative autonomous driving apparatus when a driver does not respond to a driving mode change request |
| 17, 18 | A driver changes mode through an HVI (via button pressing or speech recognition) when the driver is in normal state |

The safety-centered driving control change is characterized in that, unlike the above-described convenience-centered driving control change, a driver does not need to be in a normal state and a driving mode may be automatically changed in a dangerous situation. However, in order to enable automatic change, such automatic change must be reported in advance to the cooperative autonomous driving apparatus so that automatic change is possible using a method, such as a method by which the driver presses an automatic change button in advance. Conditions for safety-centered driving control change are given in the following Table 2.

TABLE 2

| Change No. | Driving control change method and condition |
|---|---|
| 1 | A driver requests change through an HVI (via button pressing or speech recognition) when the driver is in normal state, and when a cooperative autonomous driving apparatus is normally operated |
| 2 | Driving mode is automatically changed by a cooperative autonomous driving apparatus when (driver risk index ≥ driving impossible risk index) is satisfied, and when a vehicle is present in a cooperative driving possible section A driver requests change through an HVI (via button pressing or speech recognition) when the driver is in normal state, and when the vehicle is present in the cooperative driving possible section |
| 3 | Driving mode is automatically changed by a cooperative autonomous driving apparatus when (driver risk index ≥ driving impossible risk index) is satisfied, and when a vehicle is present in an autonomous driving possible section A driver requests change through an HVI (via button pressing or speech recognition) when the driver is in normal state, and when the vehicle is present in the autonomous driving possible section |
| 4 | Driving mode is automatically changed by a cooperative autonomous driving apparatus when (driver risk index ≥ driving impossible risk index) is satisfied, and when a vehicle is present in a cooperative driving possible section A driver requests change through an HVI (via button pressing or speech recognition) when the driver is in normal state, and when the vehicle is present in the cooperative driving possible section |
| 5 | Driving mode is automatically changed by a cooperative autonomous driving apparatus when (driver risk index ≥ driving impossible risk index) is satisfied, and when a vehicle is present in an autonomous driving possible section A driver requests change through an HVI (via button pressing or speech recognition) when the driver is in normal state, and when the vehicle is present in the autonomous driving possible section |
| 6 | Driving mode is automatically changed by a cooperative autonomous driving apparatus when (driver risk index ≥ driving impossible risk index) is satisfied, and |

TABLE 2-continued

| Change No. | Driving control change method and condition |
|---|---|
| | when a vehicle is present in an autonomous driving possible section<br>A driver requests change through an HVI (via button pressing or speech recognition)<br>when the driver is in normal state, and<br>when the vehicle is present in the autonomous driving possible section |
| 7 | A cooperative autonomous driving apparatus requests change through an HVI (via display or speech)<br>when (driver risk index < driving impossible risk index) is satisfied, and<br>when a predetermined time before a change from an autonomous driving possible section to an autonomous driving-leading cooperative driving possible section is made<br>A driver requests change through the HVI (via button pressing or speech recognition)<br>when (driver risk index < driving impossible risk index) is satisfied, and<br>when the vehicle is present in the autonomous driving possible section |
| 8 | A cooperative autonomous driving apparatus requests change through an HVI (via display or speech)<br>when (driver risk index < driving impossible risk index) is satisfied,<br>when the cooperative autonomous driving apparatus is normally operated, and<br>when a predetermined time before a change from an autonomous driving possible section to an undecided section is made<br>A driver changes mode through an HVI (via button pressing or speech recognition)<br>when the driver is in normal state, and<br>the cooperative autonomous driving apparatus must be normally operated |
| 9 | A cooperative autonomous driving apparatus requests change through an HVI (via display or speech)<br>when (driver risk index < driving impossible risk index) is satisfied, and<br>when a predetermined time before a change from an autonomous driving possible section to an autonomous driving impossible section is made<br>A driver changes mode through the HVI (via button pressing or speech recognition)<br>when the driver is in normal state |
| 10 | A cooperative autonomous driving apparatus requests change through an HVI (via display or speech)<br>when (driver risk index < driving impossible risk index) is satisfied,<br>when the cooperative autonomous driving apparatus is normally operated, and<br>when a predetermined time before a change from a cooperative driving possible section to an undecided section is made<br>A driver changes mode through the HVI (via button pressing or speech recognition)<br>when the driver is in normal state, and<br>the cooperative autonomous driving apparatus must be normally operated |
| 11 | A cooperative autonomous driving apparatus requests change through an HVI (via display or speech)<br>when (driver risk index < driving impossible risk index) is satisfied, and<br>when a predetermined time before a change from a cooperative driving possible section to an autonomous driving impossible section is made<br>A driver changes mode through the HVI (via button pressing or speech recognition)<br>when the driver is in normal state |
| 12 | A driver changes mode through an HVI (via button pressing or speech recognition)<br>when the driver is in normal state |
| 13, 14 | Mode is automatically changed by a cooperative autonomous driving apparatus<br>when part of hardware or software of the cooperative autonomous driving apparatus fails |
| 15, 16 | Mode is automatically changed by a cooperative autonomous driving apparatus<br>when a driver does not respond to a driving mode change request |
| 17, 18 | A driver changes mode through an HVI (via button pressing or speech recognition)<br>when the driver is in normal state |

Figure 5:
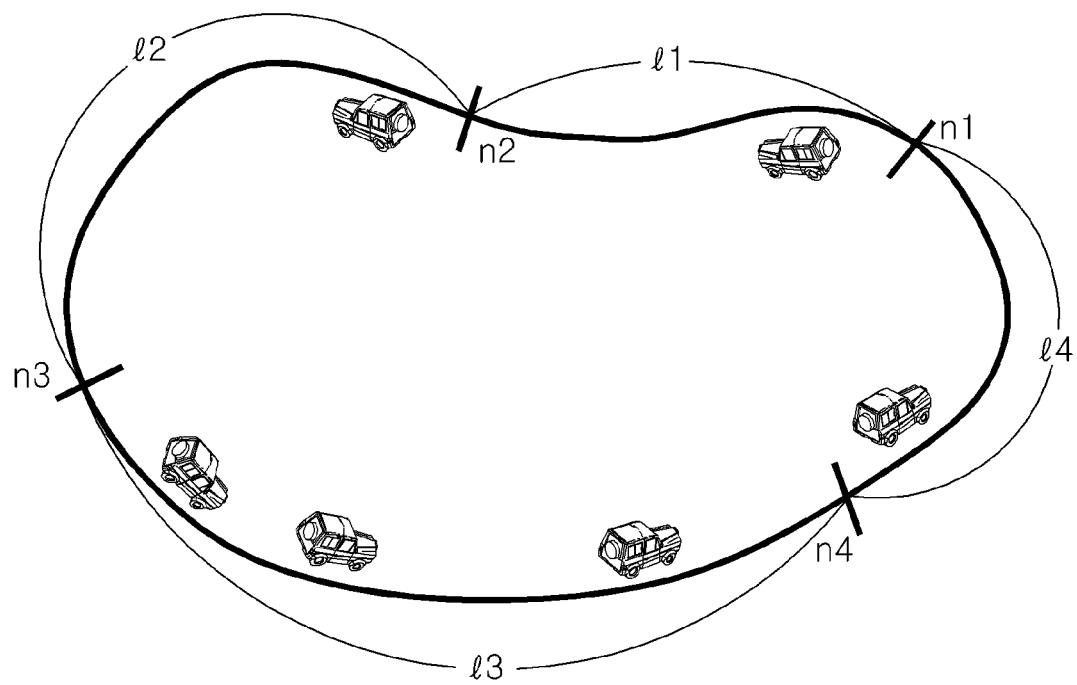
FIG. 5 is a diagram showing an embodiment to which the cooperative autonomous driving apparatus according to the present invention is applied.

FIG. 5 is a diagram showing an embodiment to which the cooperative autonomous driving apparatus according to the present invention is applied. Below, the embodiment to which the cooperative autonomous driving apparatus according to the present invention is applied will be described in detail with reference to FIG. 5.

FIG. 5 illustrates an example of a path in which a plurality of nodes n1, n2, n3, and n4 and a plurality of sections 11, 12, 13, and 14 are present. Here, it is assumed that section 11 is an undecided section, section 12 is a cooperative driving possible section, section 13 is an autonomous driving possible section, and section 14 is an autonomous driving impossible section. Here, the nodes n1, n2, n3, and n4 are points at which the sections 11, 12, 13, and 14 are changed.

First, it is assumed that a vehicle in which a driver is riding passes through the node n1 and is then present in the section 11. Since the section 11 is the undecided section, the driver drives the vehicle in a manual mode. In this case, the cooperative autonomous driving apparatus analyzes the risk index of the section 11 at preset periods.

Thereafter, the vehicle passes to the section 12 via the node n2. In this case, since the vehicle has moved to a new section, that is, the section 12, the section characteristics of the previous section, that is, the section 11, are analyzed and are stored in the section data of the DB. For example, it is assumed that a preset driving possible risk index is 20 and a preset driving impossible risk index is 50. When the risk index of the section 11 is calculated as 10, the section 11 is set to an autonomous driving possible section, and this setting information may be stored in the section data of the DB. Further, since the section 12 is the cooperative driving possible section, the mode of the vehicle may be set to a cooperative driving mode. As described above, the cooperative autonomous driving apparatus may analyze the risk index of the section 12 at preset periods.

Thereafter, the vehicle passes to the section 13 via the node n3. Since the vehicle has moved to a new section, that is, the section 13, the section characteristics of the previous section, that is, the section 12, are analyzed and are stored in the section data of the DB. If the risk index of the section 12 stored in the DB is 30, and a currently calculated risk index is 25, the risk index of the section 12 stored in the DB is not updated. However, if the risk index of the section 12 stored in the DB is 30, and a currently calculated risk index is 40, the risk index of the section 12 stored in the DB is updated to 40. However, since this value is less than the preset driving impossible risk index and is greater than the preset driving possible risk index, the driving mode of the section 12 is not updated. Furthermore, in the driving mode of the section 13, since the section characteristics of the section 13 correspond to the autonomous driving possible section, the driver may yield control to the cooperative autonomous driving apparatus. That is, the driver may set the driving mode to an autonomous driving mode. Further, the cooperative autonomous driving apparatus may analyze the risk index of the section 13 at preset periods. Furthermore, since the section 14 is the autonomous driving impossible section, the cooperative autonomous driving apparatus previously notifies the driver of section information before entering the section 14, thus causing the driving mode to be changed to the manual mode.

Figure 6:
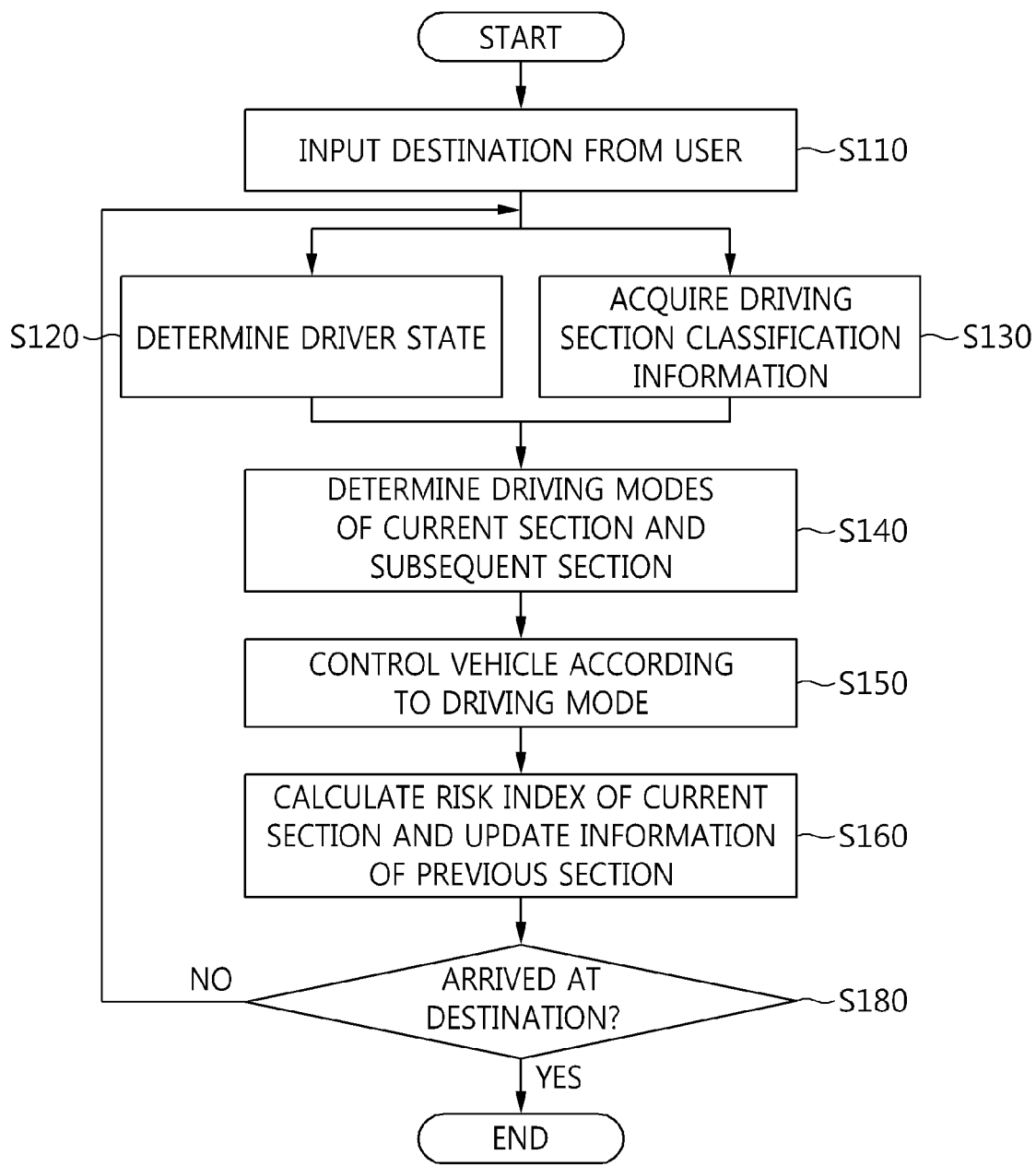
FIG. 6 is a flowchart showing a cooperative autonomous driving method according to an embodiment of the present invention.

FIG. 6 is a flowchart showing a cooperative autonomous driving method according to an embodiment of the present invention. Below, a cooperative autonomous driving method according to the embodiment of the present invention will be described with reference to FIG. 6. In the following description, a repeated description of components identical to those of the cooperative autonomous driving apparatus described above with reference to FIG. 1 will be omitted for the simplicity of the description of the specification.

First, at step S110, a destination is input by the autonomous driving control unit from a driver.

Thereafter, at step S120, the state of the driver is determined by the driver state determination unit, and at step S130, the classification information of driving sections is acquired by the autonomous driving control unit. As described above with reference to FIG. 1, step S120 is the step of determining an abnormal state of the driver, such as the dozing off, inattention, or non-response of the driver. Step S120 may be performed by tracking the eye blinking of the driver or the line of sight of the driver using an eyetracker. Further, step S120 may be performed by checking whether a nomadic terminal or each device in the vehicle has been used. Furthermore, step S120 is configured to convert the state of the driver determined above into a risk index. Since such a conversion procedure has been described in detail above, a detailed description thereof is omitted here. Step S130 is the step of allowing the autonomous driving control unit to acquire driving section classification information about a current section and a subsequent section, using the autonomous driving data processing unit. Steps S120 and S130 may be sequentially performed, or may be performed in parallel, as shown in FIG. 6.

Thereafter, at step S140, the driving modes of the current section and the subsequent section are determined by the driving control determination unit. Step S140 is configured to determine the driving modes based on the state of the driver determined at step S120 and the section classification information acquired at step S130. In this case, the driving modes include a manual mode, a cooperative driving mode, an autonomous driving mode, an emergency driving mode for a failure in autonomous driving, and an emergency driving mode for the non-reaction of a driver. In this case, the cooperative driving mode is characterized in that it includes a driver-leading cooperative driving mode and an autonomous driving-leading cooperative driving mode. Further, step S140 is configured to be capable of changing the current driving mode to another driving mode corresponding to the state of the driver and the information of sections, in a section in which the vehicle is traveling. In this case, since the example of such a change has been described in detail above with reference to FIGS. 1 and 4, a description thereof will be omitted for the simplicity of the description of the present specification.

Thereafter, at step S150, the autonomous driving control unit may control the actuator of the vehicle, provide a warning to the driver through an HVI, or cause the driver to drive the vehicle in the manual mode by recognizing a driving environment and by determining a driving situation according to the driving mode determined at step S140. Since the operation of the autonomous driving control unit has been described in detail with reference to FIG. 3, a description thereof will be omitted for the simplicity of the description of the specification.

Thereafter, at step S160, after the vehicle has moved to a subsequent section, the autonomous driving data processing unit reclassifies sections using the risk indices of the respective sections calculated based on the driving environment, and updates the section data stored in the DB based on the reclassified sections. In this case, at step S160, if the vehicle has moved to the subsequent section, a previous section may be set to a cooperative driving possible section when the risk index of the previous section is greater than a preset driving possible risk index and is less than a preset driving impossible risk index. Further, at step S160, after the vehicle has moved to the subsequent section, the previous section may be set to an autonomous driving impossible section when the risk index of the previous section is greater than the preset driving impossible risk index. Furthermore, at step S160, after the vehicle has moved to the subsequent section, the previous section may be set to an autonomous driving possible section when the risk index of the previous section is less than a driving possible risk index. Furthermore, at step S160, when the vehicle is traveling in the current section, the risk index of the current section is calculated, and the risk index of the current section that has been previously stored may be updated to the calculated risk index if the calculated risk index is greater than the previously stored risk index of the current section.

Thereafter, the autonomous driving data processing unit determines via comparison whether the vehicle has arrived at the destination at step S180. If it is determined that the vehicle has not yet arrived at the destination, the process returns to a procedure after step S110, whereas if it is determined that the vehicle has arrived at the destination, all steps are terminated.

Figure 7:
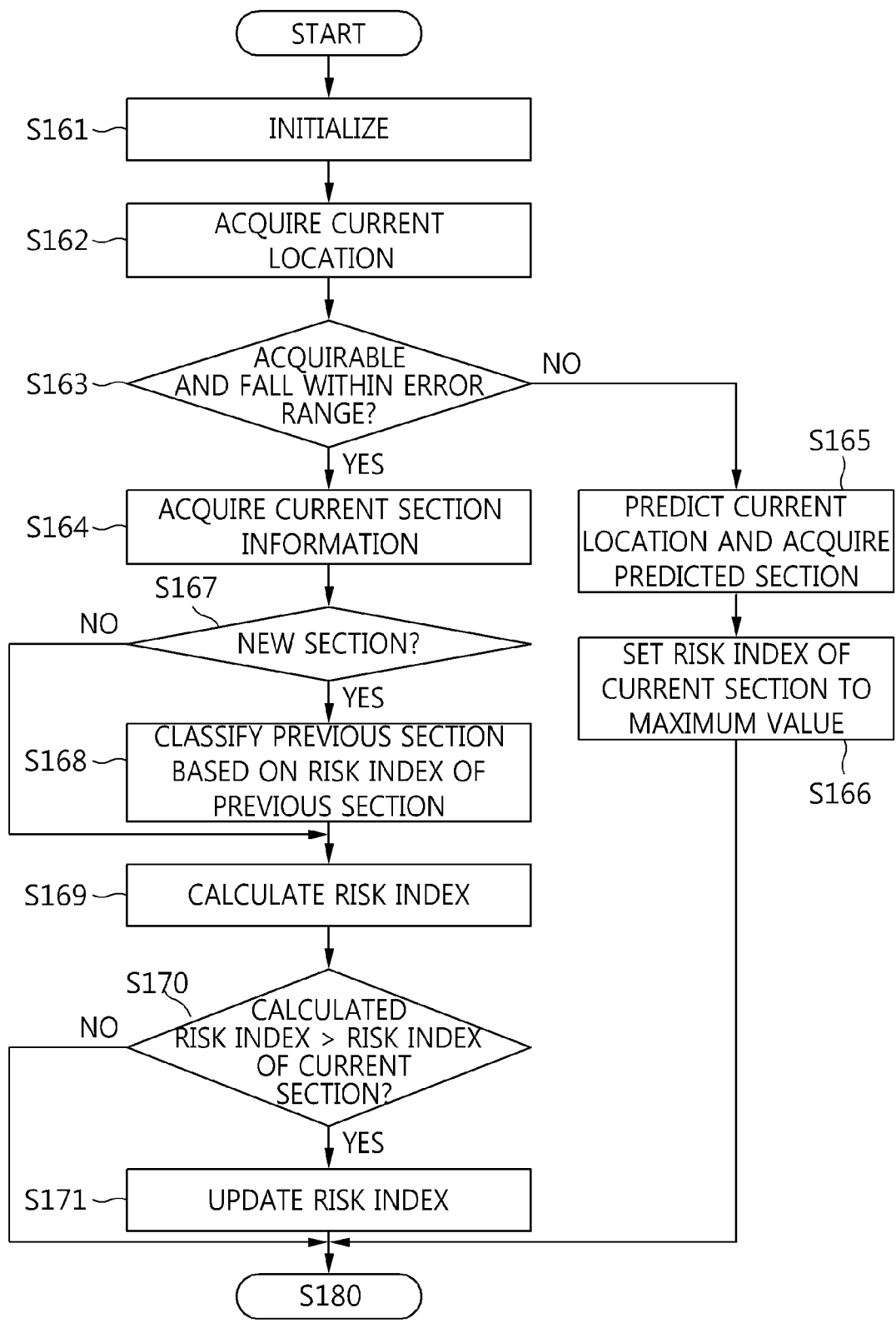
FIG. 7 is a flowchart showing a driving section analysis and update method in the cooperative autonomous driving method according to an embodiment of the present invention.

FIG. 7 is a flowchart showing a driving section analysis and update method performed by the autonomous driving data processing unit. Below, the driving section analysis and update method of the cooperative autonomous driving method performed at step S160 of FIG. 6 will be described with reference to FIG. 7.

First, at step S161, the initialization of devices required to analyze and update a driving section is performed.

Thereafter, at step S162, the autonomous driving control unit periodically acquires the current location of a recognized vehicle at step S162.

Next, at step S163, it is determined whether the current location may be acquired and whether the acquired current location falls within an error range. At step S163, if it is determined that the current location may be acquired and the acquired current location falls within the error range, the control proceeds to step S164, otherwise the control proceeds to step S165. First, a case where the current location cannot be acquired or where the acquired current location does not fall within the error range will be described below.

At step S165, the current location is predicted based on existing data present before the acquisition of the current location fails. Further, at step S165, the current section is predicted using map matching based on the predicted location.

Thereafter, at step S166, the risk index of the current section stored in the section data is set to a maximum value. The reason for this is that it is difficult to acquire an exact location from the current section and then various problems may be caused upon performing autonomous driving in the corresponding section.

If it is determined at step S163 that the acquisition of the current location succeeds and the current location falls within the error range, current section information is acquired at step S164.

Thereafter, based on the acquired current section information, it is determined whether the vehicle has entered a new section at step S167. If it is determined at step S167 that the vehicle has entered a new section, the control proceeds to step S168. In contrast, if it is determined that the vehicle is continuously traveling in the existing section, the control proceeds to step S169.

At step S168, the characteristics of the previous section are classified based on the risk index of the previous section. Since such classification has been described in detail above, a detailed description thereof will be omitted. Next, the control proceeds to step S169.

At step S169, an autonomous driving risk index is calculated.

Next, at step S170, it is determined via comparison whether the calculated risk index is greater than a value previously stored in the section data. As a result of the comparison, if the calculated risk index is greater than the value stored in the section data, the control proceeds to step S171, otherwise the control proceeds to step S180.

At step S171, the value stored in the section data is updated to the calculated risk index. Next, the control proceeds to step S180.

As described above, the cooperative autonomous driving apparatus and method according to the present invention are advantageous in that damage caused by errors that may occur due to a driving environment including road or weather conditions may be minimized, and the driving convenience and safety of a driver may be improved via cooperative driving between the vehicle and the driver.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A cooperative autonomous driving apparatus comprising:
    a driver state determination unit for determining a state of a driver and calculating the state of the driver as a driver risk index, wherein the driver state determination unit provides the driver risk index to a driving control determination unit;
    an autonomous driving control unit for classifying section characteristics of respective sections included in a path to a destination based on section data stored in a database and controlling autonomous driving of a vehicle in which the driver is riding, based on a driving environment of the path to the destination, wherein the autonomous driving control unit provides the section characteristics of the respective sections to the driving control determination unit;
    the driving control determination unit for determining driving modes of the respective sections included in the path based on the driver risk index provided by the driver state determination unit and the section characteristics provided by the autonomous driving control unit; and
    an autonomous driving data processing unit for, after the vehicle has moved to a subsequent section from a previous section, calculating an autonomous driving risk index for the subsequent section, performing comparison with respect to the calculated autonomous driving risk index, for the subsequent section and a previously stored autonomous driving risk index for the subsequent section, and updating the autonomous driving risk index for the subsequent section based on a result of the comparison.

2. The cooperative autonomous driving apparatus of claim 1, wherein each of the driving modes of the sections includes one of a manual mode, a cooperative driving mode, an emergency driving mode for a failure in autonomous driving, and an emergency driving mode for non-reaction of the driver, and the cooperative driving mode includes a driver-leading cooperative driving mode and an autonomous driving-leading cooperative driving mode.

3. The cooperative autonomous driving apparatus of claim 1, wherein the driving control determination unit is capable of changing a current driving mode to another driving mode corresponding to the state of the driver and the section characteristics in a section in which the vehicle is traveling.

4. The cooperative autonomous driving apparatus of claim 1, further comprising the autonomous driving data processing unit for, after the vehicle has moved to the subsequent section, reclassifying the section characteristics in the previous section using an autonomous driving risk index of the previous section calculated based on the driving environment of the previous section, and updating the section data stored in the database based on the reclassified section characteristics of the previous section.

5. The cooperative autonomous driving apparatus of claim 4, wherein the autonomous driving data processing unit is configured to, after the vehicle has moved to the subsequent section, set a previous section to a cooperative driving possible section if the autonomous driving risk index of the previous section is greater than a preset driving possible risk index and is less than a preset driving impossible risk index.

6. The cooperative autonomous driving apparatus of claim 4, wherein the autonomous driving data processing unit is configured to, after the vehicle has moved to the subsequent section, set a previous section to an autonomous driving impossible section if the autonomous driving risk index of the previous section is greater than a preset driving impossible risk index.

7. The cooperative autonomous driving apparatus of claim 4, wherein the autonomous driving data processing unit is configured to, after the vehicle has moved to the subsequent section, set a previous section to an autonomous driving possible section if the autonomous driving risk index of the previous section is less than a preset driving possible risk index.

8. The cooperative autonomous driving apparatus of claim 4, wherein the autonomous driving data processing unit is configured to update a previously stored autonomous driving risk index of the subsequent section to the calculated autonomous driving risk index of the subsequent section if the calculated autonomous driving risk index of the subsequent section is greater than the previously stored autonomous driving risk index of the subsequent section.

9. The cooperative autonomous driving apparatus of claim 1, wherein the driver state determination unit determines a dozing state or an inattentive state of the driver using an eyetracker for tracking eye blinking or line of sight of the driver.

10. The cooperative autonomous driving apparatus of claim 1, wherein the driver state determination unit determines an inattentive state of the driver by checking whether a nomadic device or a device in the vehicle has been used.

11. The cooperative autonomous driving apparatus of claim 1, wherein the driver state determination unit comprises a risk index determination module for converting the state of the driver into a numerical risk index.

12. The cooperative autonomous driving apparatus of claim 1, further comprising the autonomous driving data processing unit for, before the vehicle has moved to the subsequent section, calculating an autonomous driving risk index for the previous section, performing comparison with respect to the calculated autonomous driving risk index for the previous section and a previously stored autonomous driving risk index for the previous section, and updating the autonomous driving risk index for the previous section based on a result of the comparison.

13. A cooperative autonomous driving method comprising:
determining, by a driver state determination unit, a state of a driver and calculating the state of the driver as a driver risk index;
classifying, by an autonomous driving control unit, section characteristics of respective sections included in a path to a destination based on section data stored in a database;
determining, by a driving control determination unit, driving modes of the respective sections included in the path based on the state of the driver and the section characteristics;
controlling, by the autonomous driving control unit, autonomous driving of a vehicle in which the driver is riding, based on a driving environment recognized for the path to the destination;
after the vehicle has moved to a subsequent section from a previous section, calculating, by an autonomous driving data processing unit, an autonomous driving risk index for the subsequent section;
performing comparison with respect to the calculated autonomous driving risk index for the subsequent section and a previously stored autonomous driving risk index for the subsequent section; and
updating the autonomous driving; risk index for the subsequent section based on a result of the comparison.

14. The cooperative autonomous driving method of claim 13, wherein each of the driving modes of the sections includes one of a manual mode, a cooperative driving mode, an emergency driving mode for a failure in autonomous driving, and an emergency driving mode for non-reaction of the driver, and the cooperative driving mode includes a driver-leading cooperative driving mode and an autonomous driving-leading cooperative driving mode.

15. The cooperative autonomous driving method of claim 13, wherein determining the driving modes of the sections is configured to be capable of changing a current driving mode to another driving mode corresponding to the state of the driver and the section characteristics in a section in which the vehicle is traveling.

16. The cooperative autonomous driving method of claim 13, further comprising after controlling the autonomous driving of the vehicle in which the driver is riding:
after the vehicle has moved to the subsequent section, reclassifying, by the autonomous driving data processing unit, the section characteristics of the previous section using an autonomous driving risk index of the previous section calculated based on the driving environment of the previous section, and updating the section data stored in the database based on the reclassified section characteristics of the previous section.

17. The cooperative autonomous driving method of claim 16, wherein updating the section data is configured to, after the vehicle has moved to the subsequent section, set a previous section to a cooperative driving possible section if the autonomous driving risk index of the previous section is greater than a preset driving possible risk index and is less than a preset driving impossible risk index.

18. The cooperative autonomous driving method of claim 16, wherein updating the section data is configured to, after the vehicle has moved to the subsequent section, set a previous section to an autonomous driving impossible section if the autonomous driving risk index of the previous section is greater than a preset driving impossible risk index.

19. The cooperative autonomous driving method of claim 16, wherein updating the section data is configured to, after the vehicle has moved to the subsequent section, set a previous section to an autonomous driving possible section if the autonomous driving risk index of the previous section is less than a preset driving possible risk index.

20. The cooperative autonomous driving method of claim 16, wherein updating the section data is configured to update a previously stored autonomous driving risk index of the subsequent section to the calculated autonomous driving risk index of the subsequent section if the calculated autonomous driving risk index of the subsequent section is greater than the previously stored autonomous driving risk index of the subsequent section.

21. The cooperative autonomous driving method of claim 13, further comprising after controlling the autonomous driving of the vehicle in which the driver is riding:
- before the vehicle has moved to the subsequent section, calculating, by an autonomous driving data processing unit, an autonomous driving risk index for the previous section;
- performing comparison, with respect to the calculated autonomous driving risk index for the previous section and a previously stored autonomous driving risk index for the previous section; and
- updating the autonomous driving risk index for the previous section based on a result of the comparison.

* * * * *